United States Patent [19]

Simmons

[11] Patent Number: 4,657,334
[45] Date of Patent: Apr. 14, 1987

[54] PLUGGABLE ELECTRICAL CONNECTOR

[76] Inventor: Dennis L. Simmons, 418 Singley Dr., Milpitas, Calif. 95035

[21] Appl. No.: 789,466

[22] Filed: Oct. 21, 1985

[51] Int. Cl.$^4$ .............................................. H01R 29/00
[52] U.S. Cl. .............................. 339/166 R; 339/32 R; 339/123
[58] Field of Search ................... 339/123, 166, 176 M, 339/32 R

[56] References Cited

U.S. PATENT DOCUMENTS

| | | | |
|---|---|---|---|
| 3,016,512 | 1/1962 | Borchard | 339/176 M |
| 4,040,710 | 8/1977 | Damsky | 339/166 R X |
| 4,090,769 | 5/1978 | Damsky | 339/166 R X |
| 4,273,957 | 6/1981 | Kolling | 339/123 X |
| 4,477,141 | 10/1984 | Hardesty | 339/123 X |

Primary Examiner—Eugene F. Desmond
Attorney, Agent, or Firm—Flehr, Hohbach, Test, Albritton & Herbert

[57] ABSTRACT

A modular telephone connector assembly (10) includes an electrical receptacle (22) having sockets (28). A face plate (42) is configured for mounting on a wall (20). A jack (48) extends from front surface (50) of the face plate (42) to its rear surface (44). Pins (30) plug into sockets (28). The electrical receptacle (22) and box (12) are wired and mounted on framing members (14) of wall (20) before Sheetrock (18) is attached to the framing members (14). The face plate is then attached to the electrical receptacle (22) by plugging pins (30) into sockets (28) after the Sheetrock (18) is in place.

5 Claims, 4 Drawing Figures

PLUGGABLE ELECTRICAL CONNECTOR

BACKGROUND OF THE INVENTION

1. Field of the Invention

This invention relates to an electrical connector which is partially installed during the construction of a building, with the installation being completed by simply plugging together two pieces of the connector to give a completed connector assembly. More particularly, it relates to such a connector assembly which requires only a single visit of an installer for prewiring during building construction for installation. Most especially, it relates to such a connector assembly especially adapted for telephone wiring.

2. Description of the Prior Art

A variety of telephone connectors and telephone connector assemblies are known in the prior art. Examples of such connectors and assemblies are shown in the following issued U.S. Pat. Nos.: 3,513,261, issued May 19, 1970 to Dal Monte et al.; 3,668,324, issued June 6, 1972 to Firestone; 3,812,451, issued May 21, 1974 to Buglewicz; 4,071,696, issued Jan. 31, 1978 to Anderson; 4,088,384, issued May 9, 1978 to Gumb; 4,178,062, issued Dec. 11, 1979 to Abbo; 4,188,505, issued Feb. 12, 1980 to O'Conner and 4,235,501, issued Nov. 25, 1980 to Ericsson. Included in the above patents are a variety of telephone connectors of the modular type, including such connectors which allow pre-existing telephone wiring to be adapted for use with modular connectors.

Particularly since the utilization of modular telephone connectors has become widespread, it has become common to install telephone wiring within building walls during construction or renovation of a building. Prewiring is accomplished after the walls have been framed, but before Sheetrock has been placed on the building walls. As now practiced, it is necessary for a telephone installer to make at least two visits to a building site during construction, once to do the prewiring, and again to attach modular telephone jacks to the prewiring after the Sheetrock is in place. While the necessity to make two such visits materially increases the cost of installation, there are presently no modular connector assemblies that can be completely installed at the time of prewiring. While this situation has first become noticeable in the case of telephone wiring, similar considerations apply for other types of wiring, such as for data processing system local area networks.

SUMMARY OF THE INVENTION

Accordingly, it is an object of this invention to provide an electrical connector assembly which can be installed in a single procedure during building wiring prior to placing Sheetrock on building walls.

It is another object of the invention to provide such an electrical connector assembly in which a portion of the assembly which extends over Sheetrock on the wall may be put in place by a simple plugging operation.

It is a further object of the invention to provide such an electrical connector assembly configured to supply more than one electrical circuit to a wall outlet, with the connector allowing electrical equipment to be selectively connected to the different circuits by changing orientation of part of the connector assembly.

It is still another object of the invention to provide such an electrical connector assembly especially configured for telephone wiring.

It is a still further object of the invention to provide such an electrical connector assembly which is usable with different thickness Sheetrock over plywood.

The attainment of these and related objects may be achieved through use of the novel electrical assembly herein disclosed. The electrical assembly of this invention includes an electrical receptacle having a plurality of sockets. A face plate is configured for mounting on a wall. The face plate has a front surface and a rear surface, with a jack extending from the front surface of the face plate through the face plate to its rear surface. A plurality of electrically conductive members removably engages the sockets of the electrical receptacle in mating relationship. Either the electrical receptacle or the electrically conductive members is attached to the face plate extending from the rear surface of the face plate. A means is configured for mounting either the electrical receptacle or the electrically conductive members in an electrical receptacle box. The jack is electrically connected to either the electrical receptacle or to a plurality of electrically conductive members, whichever is attached to the face plate. In a prefered form of the invention, the electrically conductive members are attached to the face plate and the electrical receptacle is configured for mounting in the electrical receptacle box.

In use of the electrical connector assembly of this invention, the telephone or other electrical wiring is installed during construction or renovation of a building prior to placement of Sheetrock on the building walls. The electrical receptacle box is mounted on the framed building walls, with either the electrical receptacle or the plurality of electrically conductive members in place within the electrical receptacle box. The Sheetrock is fastened to the framed building walls with an aperture around the electrical receptacle box in a conventional manner. The face plate is then fastened over the electrical receptacle box by simply plugging the electrically conductive members and the sockets into mating relationship. This mode of installation means that an installer can complete the wiring before the Sheetrock is in place, and the electrical installation can be simply completed by plugging the electrical assembly of this invention together. The electrical installation can therefore be readily completed by the telephone customer or contractor, without requiring a return visit by the installer.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
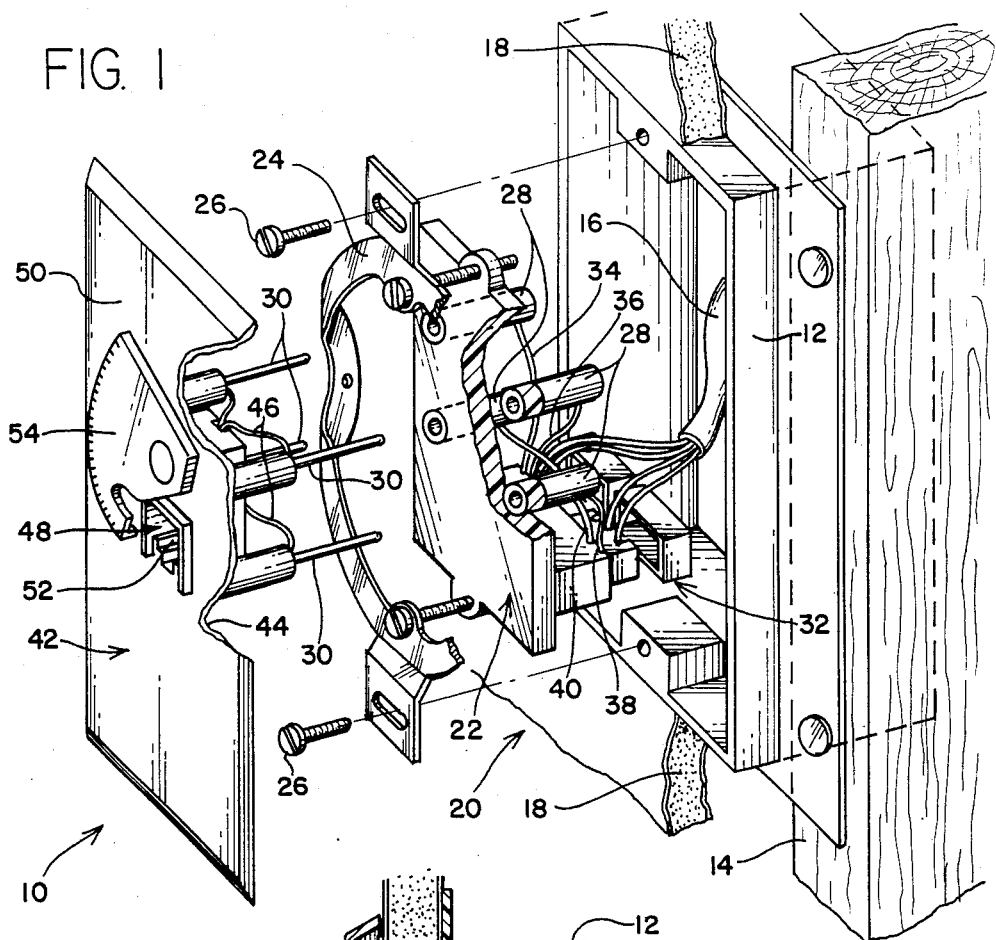
FIG. 1 is an exploded perspective view of an electrical connector assembly in accordance with the invention, with partial cut aways to show detail.
Figure 2:
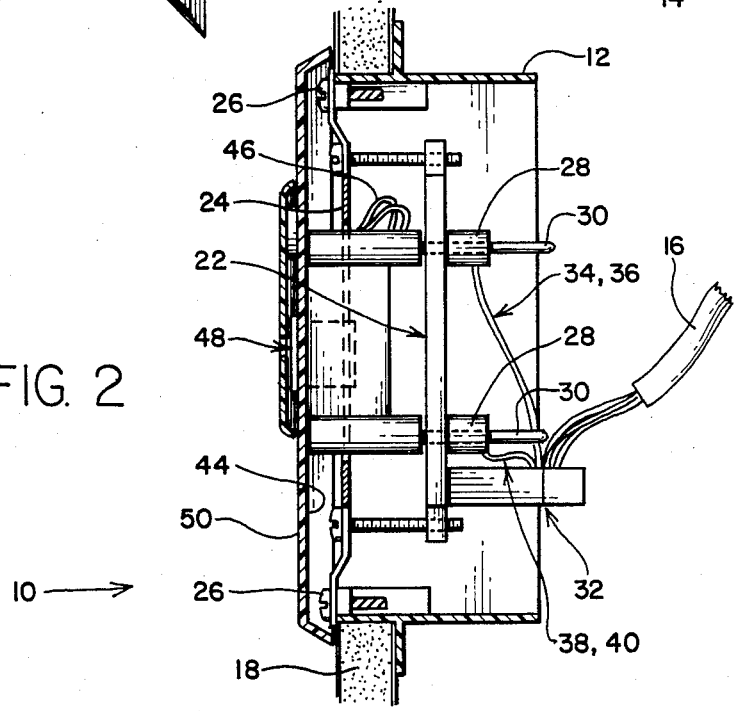
FIG. 2 is a cross-section view taken along the line 2—2 in FIG. 1, but showing the connector assembly in assembled relationship.

Turning now to the drawings, more particularly to FIGS. 1-2, there is shown an electrical connector assembly 10 in accordance with the invention. As shown, an electrical receptacle box 12 is mounted on wall framing 14 in a conventional manner. Telephone wires 16 are strung within the framing 14 prior to attachment of Sheetrock 18 over the framing 14 to form a completed wall 20.

An electrical receptacle 22 is mounted within the receptacle box 12 by yoke 24 and screws 26. The sockets 28 are configured and positioned for removably engaging pins 30.

The telephone wires 16 are connected to the receptacle 22 by snap-in connectors 32. A first pair of connecting wires 34 and 36 is connected between one of the snap in connectors 32 and the upper sockets 28. A second pair of connecting wires 38 and 40 is connected between lower sockets 28 and the other snap in connector 32. In this manner, the upper and lower sockets 28 are connected in two different telephone circuits, for example, each representing a different telephone line circuit.

Pins 30 are mounted on a face plate 42 and extend toward the sockets 28 away from rear surface 44 of the face plate 42. Wires 46 connect the pins 30 to a modular telephone jack 48. As shown, the jack 48 is connected as an RJ14 type or equivalent since it includes connections for a 2 line telephone set. For use with a single line telephone set, the modular jack would be connected as an RJ1 type. The jack 48 extends from front surface 50 of the face plate 42 through the face plate to rear surface 44. Opening 52 receives a modular telephone connection plug in a conventional manner. Cover 54 is pivotally attached to the face plate 42 to cover the opening 52. If desired, screws (not shown) can be provided for attaching the face plate 42 to the yoke 24 by means of apertures (not shown) through the face plate 42 and yoke 24 in a conventional manner.

In use, after the Sheetrock 18 has been installed on the wall 20, the pins 30 are plugged into sockets 28 in order to connect jack 48 to the wires 16 in the telephone circuits. The pins 30 and sockets 28 hold the face plate 42 in place with rear surface 44 flush against the Sheetrock 18 and over the electrical receptacle box 12. If a single line RJ1 type jack is employed, only two of the pins 30 are connected to the jack. However, because the other two pins are symmetrically positioned with respect to the first two pins 30, the single line of the RJ1 jack can be connected to the other telephone circuit by simply unplugging the pins 30, rotating the face plate 42 180 degrees and plugging the pins 30 into sockets 28 again.

As is best shown in FIG. 2, the pins 30 extend beyond the sockets 28 when the assembly 10 is used with the thickness of Sheetrock 18 shown, for example, ½ inch. This extra length of the pins 30 and open rear end of the sockets 28 allows thicker Sheetrock, for example, ⅝ inch thick, to be employed, or even Sheetrock over plywood, and still allow reliable connection between the pins 30 and the sockets 28 and secure holding of the face plate 42 in place with different thickness wall materials.

Figure 3:
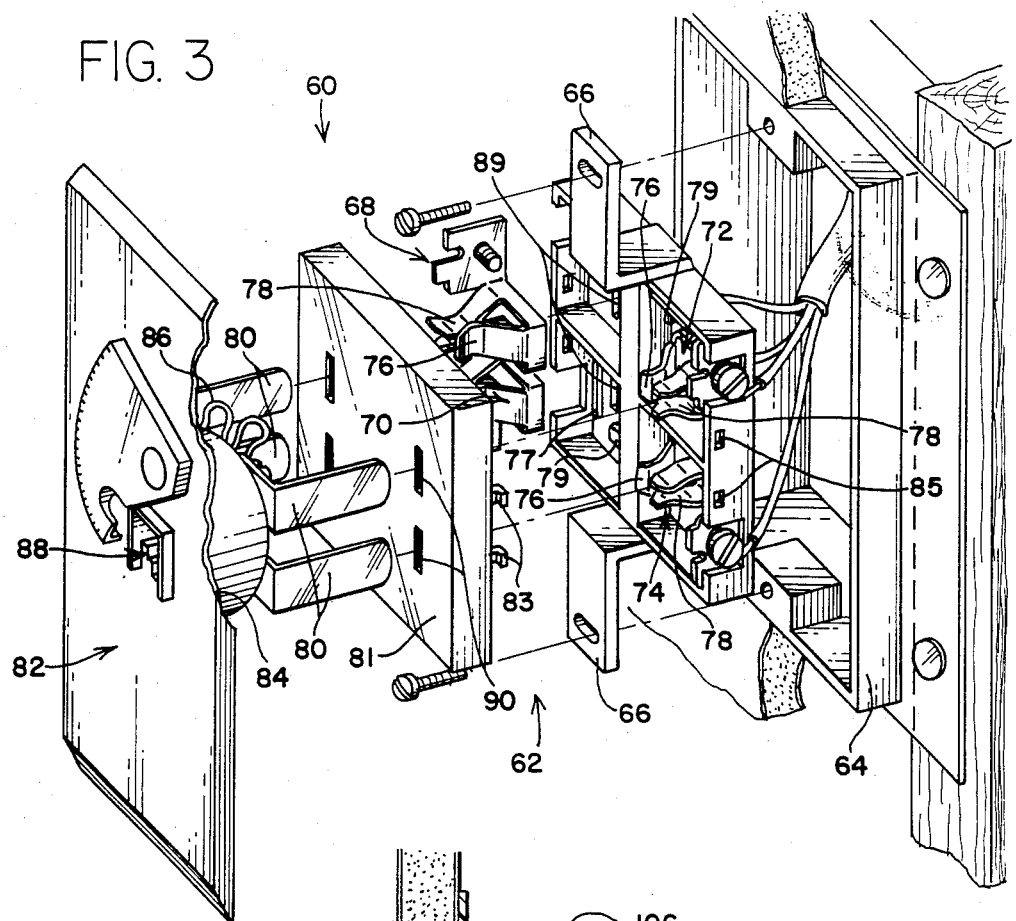
FIG. 3 is an exploded perspective view of a second embodiment of an electrical connector assembly in accordance with the invention.

FIG. 3 shows another telephone assembly 60 in accordance with the invention. The assembly 60 has an electrical receptacle 62 attached to an electrical receptacle box 64 by means of tabs 66. Four sets 68, 70, 72 and 74 of opposed spring electrical contacts 76 and 78 are mounted in the electrical receptacle 62. Ridges 77 and 79 serve to locate the contact sets 68-74 in the receptacle 62. Cover 81 attaches to the receptacle 62 by means of projections 83 and holes 85. The opposed spring contact 76 and 78 in each set 68-74 form sockets in that they are positioned and configured to engage one of prongs 80 mounted to face plate 82 and extending away from rear surface 84 of the face plate 82. Wires 86 connect the prongs 80 to a modular telephone jack 88, which extends through the face plate 82 in the same manner as in the FIGS. 1 and 2 embodiment. The prongs 80 are symmetrically arranged on the face plate 82, so that a single line telephone set can be selectively connected to one of two telephone lines connected to the sets 68-74 of contacts 76 and 78, by rotating the faceplate 82 in the same manner as with the FIGS. 1 and 2 embodiment. The configuration of contacts 76 and 78 and prongs 80 also allows this embodiment to be used with different thickness wall materials while obtaining good electrical contact and secure holding of the face plate 82 as in the FIGS. 1-2 embodiment. The prongs 80 are also free to extend beyond the spring contacts 76 and 78 through slots 84 in the receptacle behind the contact sets 68-74 a greater or lesser extent, as results from thinner or thicker wall materials. Slats 86 in the cover 81 assure that the prongs 80 are properly positioned with respect to the contact sets 68-74. Other than as shown and described, the construction and operation of the FIG. 3 embodiment is the same as the FIGS. 1 and 2 embodiment.

Figure 4:
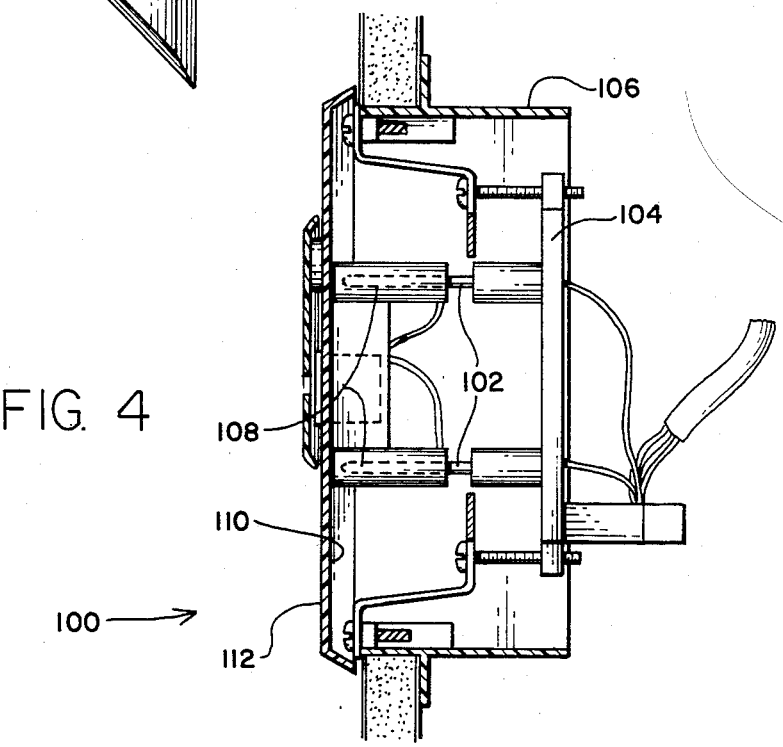
FIG. 4 is a cross-section view of a third embodiment of an electrical connector assembly in accordance with the invention.

FIG. 4 shows a third form of a pluggable telephone connector assembly 100 in accordance with the invention. The assembly 100 has the same configuration as the assembly 10 in FIGS. 1 and 2, except that the pins 102 are mounted on the electrical receptacle 104 in electrical receptacle box 106 and extend outward from the receptacle 104. Mating sockets 108 extend from rear surface 110 of face plate 112. Other than as shown and described, the construction and use of the FIG. 4 embodiment is the same as in the FIGS. 1 and 2 embodiment.

It should now be readily apparent to those skilled in the art that a novel pluggable connector assembly capable of achieving the stated objects of the invention has been provided. Because the face plate of this connector assembly is attached over the electrical receptacle and receptacle box by a simple plugging operation, the electrical receptacle and box can be installed and wired prior to attaching Sheetrock to a building wall, and the face plate put in place after the Sheetrock has been attached, without requiring a second visit by an installer. If the mating electrical contacts on the face plate and the electrical receptacle are provided in a symmetrical relationship, different electrical circuits can be connected via the face plate by changing the orientation of the face plate. While the invention is particularly useful in telephone circuits, it is capable of use in a wide variety of other electrical circuits as well, such as computer local area network circuits.

It should further be apparent to those skilled in the art that various changes in form and details of the invention as shown and described may be made. For example, the face plates 42 and 82 could be held in place in the completed assembly by screws in a conventional manner as well, if desired. It is intended that such changes be included within the spirit and scope of the claims appended hereto.

What is claimed is:

1. A telephone connector assembly, which comprises an electrical receptacle configured for mounting in an electrical receptacle box, said electrical receptacle having a plurality of sockets, a face plate configured for placement on a wall over the electrical receptacle box, said face plate having a front surface and a rear surface, a telephone jack extending from the front surface through said face plate to the rear surface thereof, and a plurality of electrically conductive members mounted on said face plate and extending away from the rear surface of said face plate, said electrically conductive members being electrically connected to said telephone jack, configured and positioned for overlapped mating engagement along a common axis with said plurality of sockets, said face plate and a wall against which said face plate is positioned in flush engagement coacting to position said said electrically conductive members and said plurality of sockets in the overlapped mating engagement along the common axis when said electrical receptacle is installed in a wall mounted electrical receptacle box and said electrically conductive members are inserted in said sockets, said plurality of conductive members and said plurality of sockets being configured to establish electrical contact with different longitudinal overlapped positioning along the common axis with respect to one another by said plurality of sockets each having an open end facing away from said face plate and said plurality of electrically conductive members having a length such that their tips extends beyond the open socket ends when the assembly is used with thinner wall material and are contained entirely within said plurality of sockets when the assembly is used with thicker wall material, the different overlapped positioning varying with thickness of a wall material over which said face plate is mounted on the wall.

2. The electrical connector assembly of claim 1 in which said electrically conductive members comprise a plurality of pins.

3. The electrical connector assembly claim 1 in which said electrically conductive members comprise a plurality of prongs having opposed, planar surfaces and the sockets of said electrical receptacle each comprise a pair of spring contacts for engaging the opposed, planar surfaces of one of said prongs.

4. An electrical connector assembly, which comprises an electrical receptacle, configured for mounting in an electrical receptacle box, said electrical receptacle having a plurality of sockets, a face plate configured for placement on a wall over the electrical receptacle box, said face plate having a front surface and a rear surface, a jack extending from the front surface through said face plate to the rear surface thereof, and a plurality of electrically conductive members mounted on said face plate and extending away from the rear surface of said face plate, said electrically conductive members being electrically connected to said jack, configured and positioned for overlapped mating engagement along a common axis with said plurality of sockets, said face plate and a wall against which said face plate is positioned in flush engagement coacting to position said electrically conductive members and said plurality of sockets in the overlapped mating engagement along the common axis when said electrical receptacle is installed in a wall mounted electrical receptacle box and said electrically conductive members are inserted in said sockets, said plurality of conductive members and said plurality of sockets being configured to establish electrical contact with different longitudinal overlapped positioning along the common axis with respect to one another, the different positioning varying with thickness of a wall material over which said face plate is mounted on the wall, said plurality of sockets being symmetrically arranged on said electrical receptacle in a first pair and a second pair for changeable connection in a first electrical circuit and a second electrical circuit by rotation of said face plate.

5. The electrical connector assembly of claim 4 in which said jack is electrically connected to a pair of said plurality of electrically conductive members, said electrically conductive member pair being positioned on said face plate so that said electrically conductive member pair engages the first socket pair when said face plate is in a first orientation with respect to said electrical receptacle and engages the second socket pair when said face plate is rotated 180 degrees from the first orientation to a second orientation with respect to said electrical receptacle.

* * * * *